United States Patent [19]

Feutrel

[11] Patent Number: 4,622,204
[45] Date of Patent: Nov. 11, 1986

[54] SPACER GRID FOR NUCLEAR REACTOR FUEL ASSEMBLY

[75] Inventor: Claude Feutrel, Vauhallan, France

[73] Assignee: Commissariat a l'Energie Atomique, France

[21] Appl. No.: 720,655

[22] Filed: Apr. 8, 1985

Related U.S. Application Data

[63] Continuation of Ser. No. 457,438, Jan. 12, 1983, abandoned.

[30] Foreign Application Priority Data

Jan. 20, 1982 [FR] France .................................. 82 00834

[51] Int. Cl.$^4$ ................................................ G21C 3/34
[52] U.S. Cl. ...................................... 376/442; 376/449
[58] Field of Search ........................ 376/441, 442, 449

[56] References Cited

U.S. PATENT DOCUMENTS

| | | | |
|---|---|---|---|
| 3,377,254 | 4/1968 | Frisch .................. | 376/442 |
| 3,379,617 | 4/1968 | Andrews et al. ............... | 376/442 X |
| 3,679,547 | 7/1972 | Warberg ..................... | 376/442 X |
| 3,713,974 | 1/1973 | Previti et al. ..................... | 376/442 X |
| 3,762,996 | 10/1973 | Milburn et al. ..................... | 376/442 |
| 3,844,887 | 10/1974 | Georges et al. ..................... | 376/442 |
| 3,920,515 | 11/1975 | Ferrari et al. ......................... | 376/442 |
| 3,932,216 | 1/1976 | Jabsen ..................... | 376/442 X |
| 3,933,584 | 1/1976 | Litt ..................... | 376/442 |
| 4,028,180 | 6/1977 | Finch ..................... | 376/442 |
| 4,077,843 | 3/1978 | Patterson et al. .................... | 376/442 |
| 4,125,435 | 11/1978 | Jabsen ..................... | 376/442 |
| 4,137,125 | 1/1979 | Walters ..................... | 376/442 |
| 4,163,690 | 8/1979 | Jabsen ..................... | 376/442 |
| 4,165,256 | 8/1979 | Jabsen ..................... | 376/442 |
| 4,221,636 | 9/1980 | Feutrel ..................... | 376/441 |
| 4,364,902 | 12/1982 | Feutrel ..................... | 376/442 |
| 4,396,573 | 8/1983 | Feutrel ..................... | 376/442 |
| 4,474,730 | 10/1984 | Hellman et al. ..................... | 376/441 |

FOREIGN PATENT DOCUMENTS

| | | | |
|---|---|---|---|
| 0025395 | 3/1981 | European Pat. Off. . | |
| 2200587 | 4/1974 | France ..................... | 376/442 |
| 1129103 | 10/1968 | United Kingdom ................ | 376/441 |
| 2000896 | 1/1979 | United Kingdom ................ | 376/441 |

Primary Examiner—Deborah L. Kyle
Assistant Examiner—Dan Wasil
Attorney, Agent, or Firm—Kerkam, Stowell, Kondracki, & Clarke

[57] ABSTRACT

A spacer grid for a nuclear reactor fuel assembly, comprising an assembly of two families of thin partitions which are respectively parallel in each family and perpendicular from one family to the next and which bound pockets of square section through each of which a fuel rod of the cluster extends, the walls of the pocket being formed with bearing points to retain the fuel rods of the cluster, wherein it comprises bearing bridges formed by profiled bosses produced in pairs on a sheet metal tongue obtained by making two longitudinal parallel slots in the thin partition on either side of such bosses, the bosses being oppositely directed in two adjacent pockets, and the reaction of the fuel rods on the bosses after they have been positioned in the grid produces a torque on the resilient sheet metal tongue, the deformation of the tongue thus enabling the assembly tolerances of the fuel rods to be absorbed in the grid. Application to nuclear reactor assemblies.

3 Claims, 5 Drawing Figures

SPACER GRID FOR NUCLEAR REACTOR FUEL ASSEMBLY

This is a continuation, of application Ser. No. 457,438, filed Jan. 12, 1983 now abandoned.

The invention discloses a spacer grid for a nuclear reactor fuel assembly, the grid comprising pairs of opposite bearing points produced on resiliently deformable lamellae.

BACKGROUND OF THE INVENTION

The purpose of spacer grids is to space out the nuclear fuel rods in a nuclear reactor assembly. The rods must be retained parallel in a predetermined network, while at the same time ensuring that they are born in accordance with different zones distributed over their length, more particularly in order to prevent them from vibrating as a result of the circulation of a liquid coolant flowing in contact with them.

Numerous constructions are known for spacer grids of the kind specified, inter alia constructions comprising an assembly formed by two families of thin metal sheets, respectively parallel in each family and perpendicular from one family to the next, the sheets being notched at regular intervals to enable them to be fitted into one another, thus bounding pockets of square section through each of which a fuel element of the cluster extends.

Grids of that kind generally have added springs, generally made of a material different from that of the grid. For example, French Pat. No. 77 20 908, filed on July 7, 1977, for "Spacer grid for a cluster of fuel rods in a nuclear reactor assembly" discloses a spacer grid comprising spring tongues having a zig-zag profile which comprises at least two bosses bearing respectively against the rods extending through the two pockets.

The grid is made from zircaloy, the springs being made of inconel.

An attempt has been made to produce grids entirely from zircaloy, thus avoiding the use of materials with a high neutron absorption power, while allowing a simpler construction of the spacer grid, since the assembly of added springs is eliminated.

At first an attempt was made to produce grids having springs cut out directly in the partitions forming the walls of the pockets. However, tests showed that such springs did not enable the fuel rods to be durably retained, due to the relaxation of the zircaloy under irradiation. After some time the clamping force of the springs on the rods is relaxed, and they are no longer retained.

The invention relates more particularly to a spacer grid made entirely from a material having a low neutron absorption power and of very simple construction. Since it is impossible to ensure clamping during the whole life of the rods, the grid merely ensures their spacing. Of course, it remains necessary to ensure the function of retaining the rods. However, this is achieved by another means, which does not form part of the present invention. It is essential to ensure a clearance-free contact between the fuel rods and the grids, since any clearance between the grid and rods would cause the latter to wear, and this must be avoided under all circumstances. The dimensional variations due to the manufacturing tolerances of the grids must therefore be compensated. The invention solves this problem by the presence of opposite pairs of bearing points produced on resiliently deformable lamellae.

It must also be pointed out that U.S. Pat. No. 3,679,547 discloses homogeneous grids in which two superimposed bosses per pocket are produced in a lamella, the bosses each being disposed between two vertical slots and oriented in opposite directions in relation to the lamella, in the direction of two adjoining pockets. In such a construction the torques due to the presence of the rods are transmitted to the lamellae forming the grids; the torques produce in the grids deformations which are prejudicial to their stability and geometry.

It is an object of the invention to obviate these disadvantages.

BRIEF SUMMARY OF THE INVENTION

More particularly the invention relates to a spacer grid for a nuclear reactor fuel assembly, the grid comprising an assembly of two families of thin partitions respectively parallel in each family and perpendicular from one family to the next, the partitions being notched at regular intervals so as to enable them to be fitted together in order to bound pockets of square section through each of which a nuclear rod of the cluster extends, bearing points being produced in the walls of the pocket to retain the fuel rods of the cluster, wherein it comprises bearing bridges formed by profiled bosses produced in pairs on a sheet metal tongue obtained by making two longitudinal parallel slots in the thin partition on either side of such bosses the bosses being oppositely directed in two adjacent pockets, and the reaction of the fuel rods on the bosses after they have been positioned in the grid produces a torque on the resilient sheet metal tongue, the deformation of the tongue thus enabling the assembly tolerances of the fuel rods to be absorbed in the grid. Preferably the pairs of bearing points are associated with other pairs of bosses produced directly in the thin partition forming the wall of the pocket and therefore forming rigid bearing points for the fuel elements.

DESCRIPTION OF DRAWINGS

Other characteristics and advantages of the invention will be gathered from the following description with reference to the accompanying drawings, wherein.

DETAILED DESCRIPTION OF THE PREFERRED EMBODIMENTS

Figure 1:
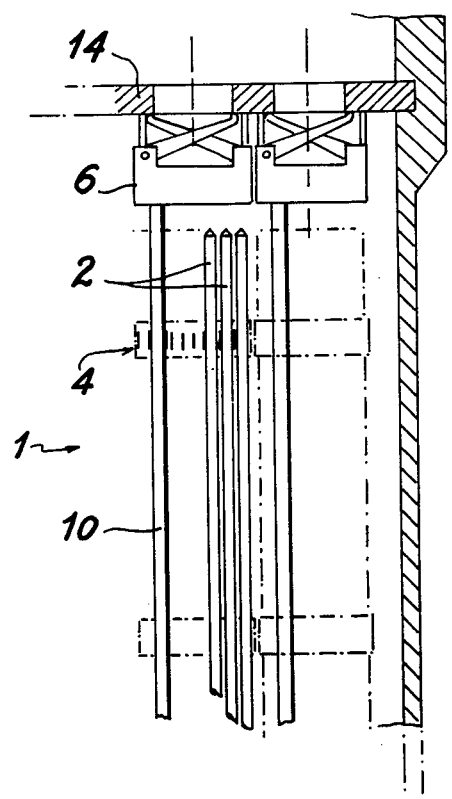
FIG. 1 is a view to an enlarged scale of a nuclear reactor fuel assembly.

FIG. 1 is a view to an enlarged scale diagrammatically illustrating a nuclear reactor fuel assembly 1 whose fuel rods 2 are retained spaced-out by grids 4 according to the invention, regularly distributed along the fuel rods. Each assembly 1 comprises a rigid frame formed by two end members 6 formed with apertures through which the cooling water circulates in the upward direction. A certain number of guide tubes 10 ensures the solidity of the assembly by being attached to the end members 6. Each fuel assembly 1 extends over several meters in length between a lower core plate (not shown) and an upper core plate 14 belonging to the internal equipment of the reactor vessel. Each assembly is positioned in relation to the core plates.

Figure 2:
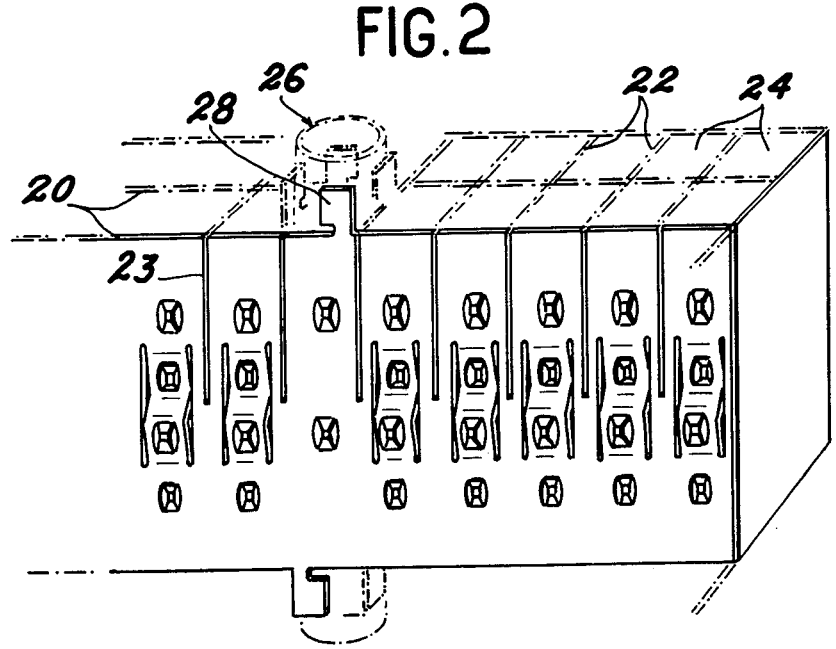
FIGS. 2 and 3 are respectively a perspective view and a plan view of a grid according to the invention.
Figure 3:
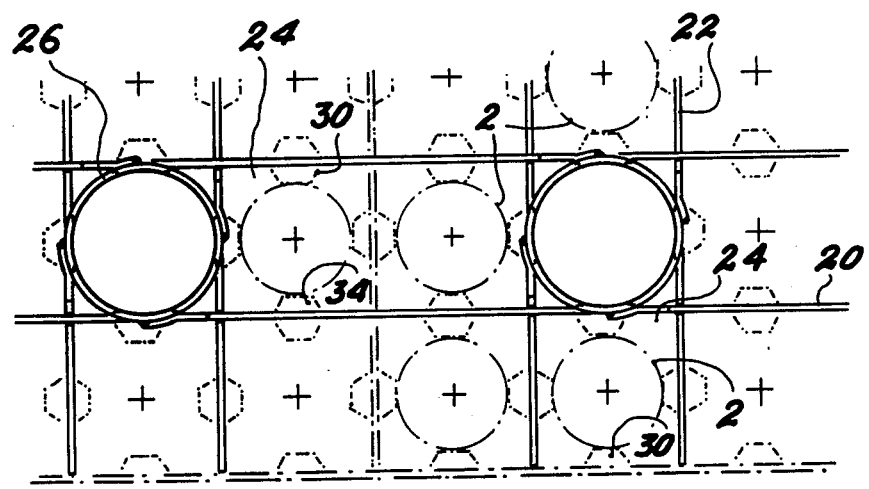

FIG. 2 is a perspective view and FIG. 3 a plan view of a grid according to the invention.

FIGS. 2 and 3 show two families of transverse metal sheets 20 and 22, parallel with one another in the same family and perpendicular in relation to one another from one family to the next, and having notches 23 at regular intervals, so that they bond a series of pockets 24 in which the fuel rods of the cluster engage. Bearing points 30 produced in the partitions of the pockets ensure the positioning of the cluster of fuel rods.

In certain pockets, cylindrical sleeves 26, welded by laser or T.I.G. welding to the grid via shoes 28 cut out in the metal sheets 20,22, allow the passage of the guide tubes, as 10.

In a grid of this kind, made entirely from a material which is incapable of reliably supporting fuel rods 2, for example, zircaloy, the rods must be supported by some other means, since the grid according to the invention does not provide such support. It merely enables the rods to be spaced out.

Figure 4:
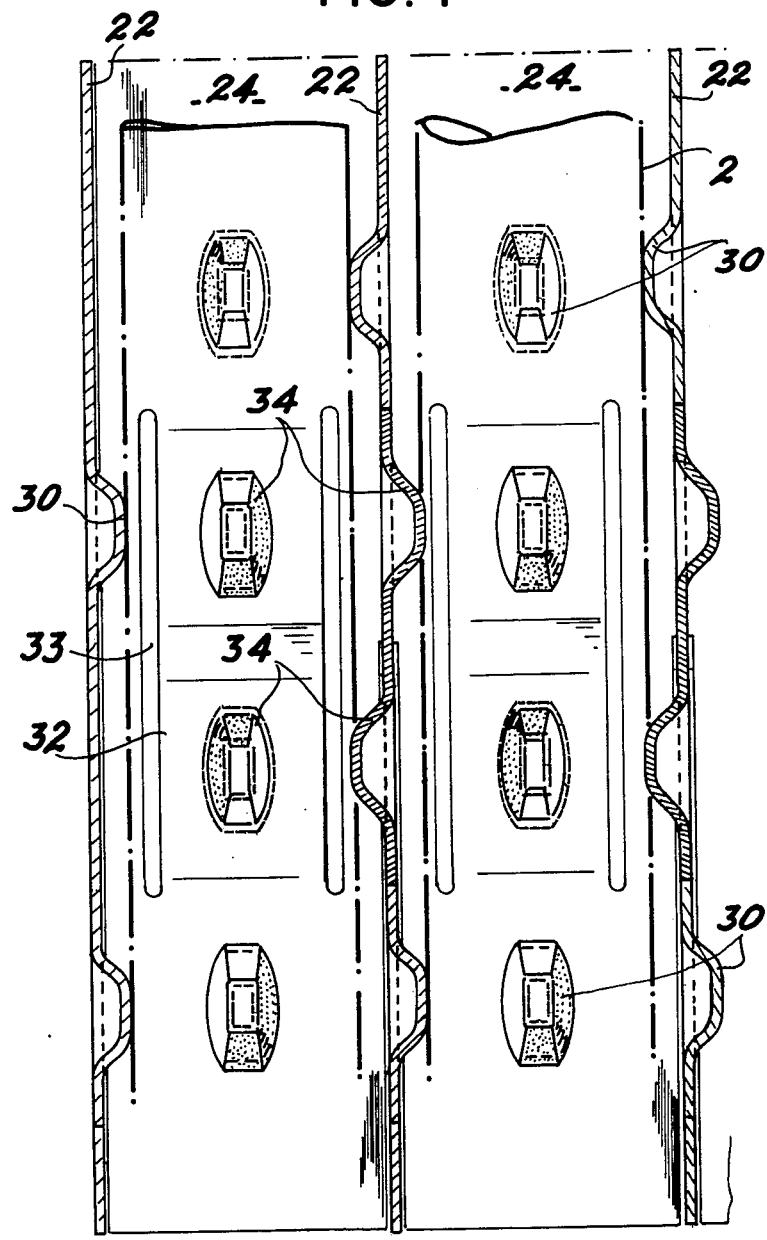
FIG. 4 illustrates the detail of the grid according to the invention.

FIG. 4 is a view of a detail of the grid according to the invention. It shows a sectional and frontal view of the metal sheets.

The partitions of the pockets are formed with bosses which bear against the fuel rod 2 (shown in chain-dot lines). The bosses are of two kinds, on the one hand rigid bosses 30, and on the other bosses 34 produced on a resiliently deformable tongue 32.

Formed on each partition of a pocket are four superimposed bearing points, two rigid bearing points 30 framing two resilient bearing points 34 disposed on the same resilient tongue 32. Since these bosses are common to two adjacent pockets, there are therefore eight bearing points in each pocket.

The bosses 34, also called resilient bosses, are disposed on a tongue disengaged from the plate by two continuous lateral slits; the bosses 34 project on either side of the plane of the partition and therefore of the tongue 32 in two adjacent pockets 24, as can be seen on the metal sheets 22 shown in profile.

The fuel rods 2 therefore react on the bearing points 34 in the opposite direction. The result is a torque on the sheet metal tongue 32 which deforms it resiliently. The deformation enables the manufacturing tolerances of the grids and the assembly tolerances of the rods in the cluster to be absorbed.

The rigid bearing points 30, like the resilient bearing points 34, are profiled so as to reduce resistance to the flow of the cooling fluid circulating in contact with them.

As clearly shown in FIG. 4, each tongue 32 extends continuously from its bosses 34 along a line parallel to slots 33 to integrally join one of the sheets 22 (corresponding to a wall of the pocket) at two opposite ends.

As against the grids disclosed in U.S. Pat. No. 3,679,547, the grids as shown in FIG. 4 enable at one and the same time deformations to be prevented from occurring in the partition as a result of the lateral transmission of the torque, while also conditioning the deformation of the tongue. Due to this torque, the bearing reactions are normally taken at the end fitting points of the tongue. The result is a normalization of the stresses on the structure of the grid formed by the partitions, thus preserving a stable configuration during the relaxation of the material used.

Figure 5:
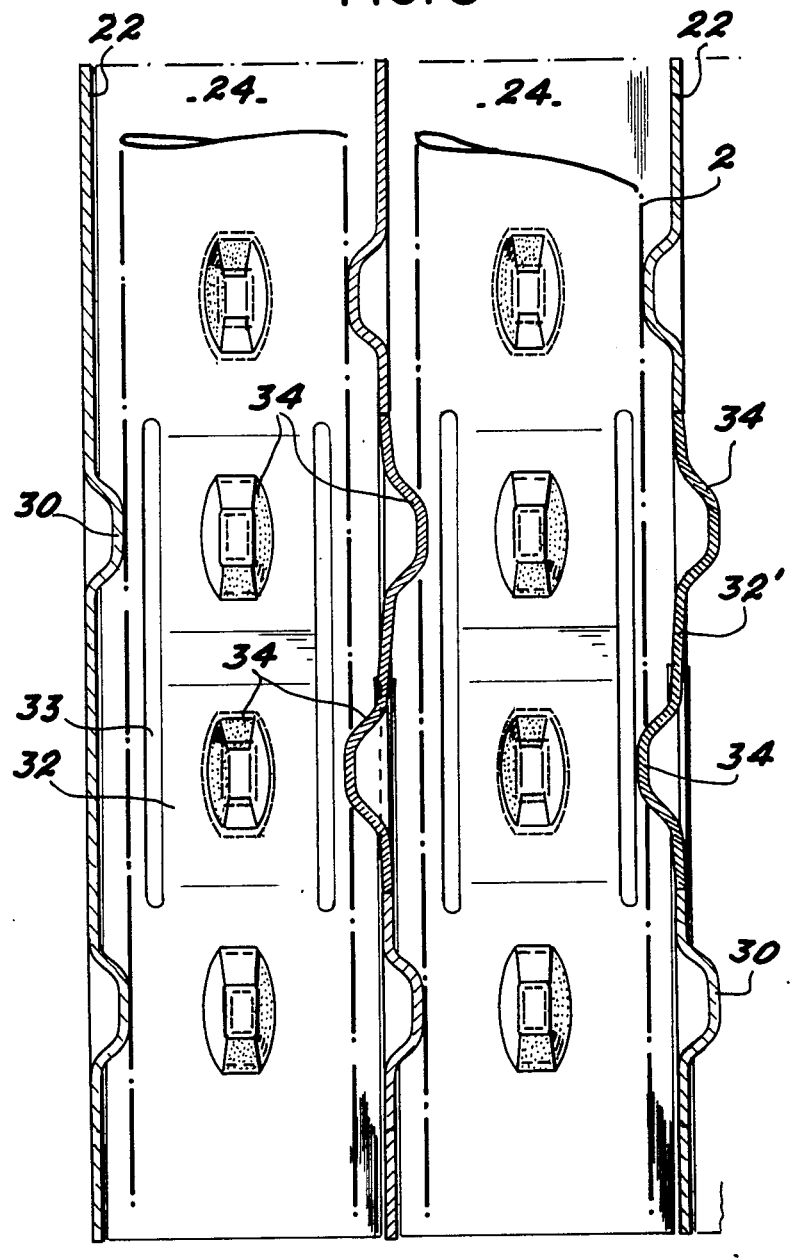
FIG. 5 is a variant of the embodiment illustrated in FIG. 4.

FIG. 5 shows a variant embodiment of the grid illustrated in FIG. 4. In this variant the resilient tongues 32 are slightly cambered during manufacture. They have a S-shaped deformation which is the opposite of the deformation which they must undergo when the fuel elements are positioned in the grid. The object of the cambering is to emphasise the effect of the grid illustrated in FIG. 4—i.e., to improve the absorption of the major grid manufacturing and rod assembly tolerances. The arrangement confers an arching effect on the tongue, which has increased rigidity against the forces transmitted by the bosses.

The grid according to the invention, which is of very simple construction, since it obviates the use of added springs, ensures the overall cohesion of the network by the interference of the bearing points between the adjoining pockets. The grid ensures the compensation of the manufacturing tolerances by the deformation of the bearings, thus enabling the fuel rods of the assembly to be retained clearance-free.

When it is made from a material such as zircaloy, which under irradiation undergoes a relaxation phenomenon and no longer applies any clamping to the rods at the end of a certain time, the clearance-free retention of the rods is safeguarded during the whole operational life of the fuel assembly.

What is claimed is:

1. A spacer grid for a nuclear reactor fuel assembly, comprising an assembly of two families of thin partitions which are respectively parallel in each family and perpendicular from one family to the next and which bound pockets of square section having four walls, each partition being entirely made of a zirconium alloy, two longitudinal parallel slots being provided in each wall to define a resilient sheet metal tongue in each of said four walls, a pair of rigid bosses on each tongue, said bosses on a tongue being oppositely directed in two adjacent pockets, each tongue extending continuously from its bosses along a line parallel to said slots to integrally join one of said four walls at two opposite ends, a pair of rigid bosses forming fuel rod bearing points produced directly in each of the four walls of a pocket and being oppositely directed in two adjacent pockets, the reaction of fuel rods on the bosses on the tongues after they have been positioned in the grid produces a torque between the opposite ends of the resilient sheet metal tongues, the deformation of the tongues thus enabling the assembly tolerances of the fuel rods to be absorbed in the grid.

2. A spacer grid according to claim 1, wherein two of the bosses produced directly in each of the four walls and forming rigid bearing points are disposed on either side, in the longitudinal direction, of said respective tongues.

3. A spacer grid according to claim 1, wherein the resilient sheet metal tongues have a chamber obtained during manufacture, such chamber being produced in the opposite direction from the deformation which the resilient tongue must undergo during the positioning of the fuel rods in the grid.

* * * * *